US012693908B2

(12) United States Patent
Li

(10) Patent No.: US 12,693,908 B2
(45) Date of Patent: Jul. 28, 2026

(54) NUMA MULTI-CORE PROCESSOR SWITCHING BETWEEN LOCK MODES, OPERATING METHOD, AND INSTRUCTIONS THEREFOR

(71) Applicant: Shanghai Zhaoxin Semiconductor Co., Ltd., Shanghai (CN)

(72) Inventor: Yong Li, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 18/964,333

(22) Filed: Nov. 29, 2024

(65) Prior Publication Data

US 2025/0370758 A1 Dec. 4, 2025

(30) Foreign Application Priority Data

May 31, 2024 (CN) .......................... 202410706525.0

(51) Int. Cl.
*G06F 9/52* (2006.01)
*G06F 9/30* (2018.01)

(52) U.S. Cl.
CPC .......... *G06F 9/526* (2013.01); *G06F 9/30087* (2013.01); *G06F 9/30021* (2013.01); *G06F 2212/2542* (2013.01)

(58) Field of Classification Search
CPC .............. G06F 9/30087; G06F 15/167; G06F 2212/2542; G06F 2212/2554
See application file for complete search history.

(56) References Cited

U.S. PATENT DOCUMENTS

| | | | | |
|---|---|---|---|---|
| 7,945,912 B1 * | 5/2011 | Nussbaum | .............. | G06F 9/526 |
| | | | | 718/104 |
| 2013/0290583 A1 * | 10/2013 | Dice | ....................... | G06F 9/526 |
| | | | | 710/200 |
| 2014/0351231 A1 * | 11/2014 | McKenney | ......... | G06F 16/1774 |
| | | | | 707/704 |
| 2022/0100587 A1 * | 3/2022 | Dice | ................... | G06F 16/2343 |
| 2023/0161641 A1 * | 5/2023 | Kogan | ....................... | G06F 9/52 |
| | | | | 718/102 |

OTHER PUBLICATIONS

Mingzhe Zhang, Haibo Chen, Luwei Cheng,Francis C. M. Lau, and Cho-Li Wang, "Scalable Adaptive NUMA-Aware Lock", Jun. 1, pp. 1754-1769 (Year: 2017).*
Dave Dice and Alex Kogan, "Fissile Locks", Jan. 14, pp. 192-208 (Year: 2021).*

* cited by examiner

*Primary Examiner* — Courtney P Spann
(74) *Attorney, Agent, or Firm* — McClure, Qualey & Rodack, LLP

(57) ABSTRACT

An efficient multi-core processor is provided, with processor instructions and an operating method associated with lock competition of a shared computing resource. A lock-application instruction is provided. Accordingly, the different processes executed by the different central processing unit (CPU) cores stand in a queue for right-of-access to the shared computing resources. The execution of the lock-application instruction is accompanied by the monitoring of a competition-level indicator. Based on the competition-level indicator, the lock of the shared computing resource is switched from a primitive lock mode that follows the first-in and first-out rule, to a Non-Uniform Memory Access (NUMA) lock mode.

24 Claims, 8 Drawing Sheets raw_spinlock

```
struct raw_spinlock{ arch_spinlock_t raw_lock;

atomic_t depth;

u16 numa_enable;

u16 count;

u16 numa_lock_index;

......

}
```

FIG. 2 optimistic_spin_queue

```
struct optimistic_spin_queue{ atomic_t tail;

atomic_t depth;

u16 numa_enable;

u16 count;

u16 numa_lock_index;

......

}
```

FIG. 3 numa_lock

```
Struct _numa_lock{ atomic_t tail;

atomic_t lock_id;

int shift;

int numa_nodes;

NUMA MULTI-CORE PROCESSOR SWITCHING BETWEEN LOCK MODES, OPERATING METHOD, AND INSTRUCTIONS THEREFOR

CROSS REFERENCE TO RELATED APPLICATIONS

This application claims priority of China Patent Application No. 202410706525.0, filed on May 31, 2024, the entirety of which is incorporated by reference herein.

BACKGROUND OF THE DISCLOSURE

Field of the Disclosure

The present disclosure relates to a multi-core processor in a non-uniform memory accessing (NUMA) architecture, which allocates shared computing resources in an optimized manner. The operating methods of such a multi-core processor and the related central processing unit (CPU) instructions are also introduced in this disclosure.

Description of the Related Art

In order to coordinate the multiple processes executed on a multi-core platform, the operating system (OS, such as Linux) kernel and the application software layer provide a locking design to make sure the multiple running processes access shared computing resources (such as memory . . . etc.) in the proper order, so that the parallel programs can be executed smoothly.

The concept of locking is to give exclusive access rights to the locked core to operate the shared computing resources. In the conventional design, the operating system generally operates primitive locks, such as a spinlock lock or an osq lock. The use of the primitive lock must follow the first-in and first-out rule.

However, a multi-core platform is generally in a non-uniform memory accessing (NUMA) architecture. The central processing unit cores of the processor (hereinafter referred to as the CPU cores) may be configured to form several NUMA nodes. To access a memory, the accessing speed of the cores at the same NUMA node with the memory is significantly faster than that required to switch between the different NUMA nodes. Using the primitive lock in the first-in and first-out manner, cross-NUMA-node events may often occur, and the data synchronization caused by the cross-NUMA-node events will result in low system performance.

BRIEF SUMMARY OF THE DISCLOSURE

A flexible solution is proposed in this disclosure. In addition to allowing the use of a primitive lock that follows the first-in and first-out rule, it can adaptively change to use a NUMA lock to meet the requirements of system operations. When using the NUMA lock, the processes running on the same NUMA node gain the priority to operate first. Data synchronization between the different NUMA nodes is significantly reduced.

A multi-core processor in accordance with an exemplary embodiment of the disclosure includes a plurality of central processing unit (CPU) cores configured to form a plurality of non-uniform memory access (NUMA) nodes. Through execution of a lock-application instruction, the different processes running on the different CPU cores applying for a lock of a shared computing resource are queued, to be locked with the shared computing resource to gain access rights to the shared computing resource. The execution of the lock-application instruction involves monitoring a competition-level indicator. In response to the competition-level indicator satisfying a first switching condition, the lock of the shared computing resource is switched from a primitive lock mode to a NUMA lock mode. In the primitive lock mode, the processes follow the first-in and first-out rule to gain the lock of the shared computing resource, regardless of their NUMA nodes. In the NUMA lock mode, the processes on the same NUMA node with the shared computing resource gain the lock of the shared computing resource first. In this manner, the shared computing resource can be adaptively allocated to the processes in a highly efficient way.

In an exemplary embodiment, after the first switching condition is satisfied, by the execution of the lock-application instruction, subsequent processes applying for the lock are refused entry to the queue until the processes already queued gain a primitive lock for operations in turn, and then the subsequent processes are queued to gain a NUMA lock. In this manner, the lock is reliably switched from the primitive mode to the NUMA mode.

In an exemplary embodiment, in response to the competition-level indicator satisfying a second switching condition, the lock of the shared computing resource is switched from the NUMA lock mode to the primitive lock mode. The bidirectional switching makes the system performance adjustable.

In an exemplary embodiment, a NUMA lock data structure includes address information. If the address information matches address information of a primitive lock mapped to the NUMA lock, the NUMA lock is reliable; otherwise, the NUMA lock is unreliable.

In an exemplary embodiment, a NUMA lock data structure includes lock information. If the lock information matches unique tag information about a primitive lock mapped to a NUMA lock presented in the NUMA lock data structure, the NUMA lock is reliable; otherwise, the NUMA lock is unreliable.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein:

FIG. 2 shows a lock data structure "raw_spinlock" modified from a primitive lock "spinlock" in accordance with an exemplary embodiment of the disclosure;

FIG. 3 shows a lock data structure "optimistic_spin_queue" extended from a primitive lock "osq_lock" in accordance with an exemplary embodiment of the disclosure;

FIG. 4 illustrates a NUMA lock data structure "numa_lock" in accordance with an exemplary embodiment of the disclosure;

DETAILED DESCRIPTION OF THE DISCLOSURE

The following description is made for the purpose of illustrating the general principles of the disclosure and should not be taken in a limiting sense. The scope of the disclosure is best determined by reference to the appended claims. The various units, modules, or functional blocks mentioned below may be implemented by a combination of hardware, software, and firmware, and may further include special circuits. The various units, modules, or functional blocks are not limited to being implemented separately, but may also be combined together to share certain functional parts.

Figure 1:
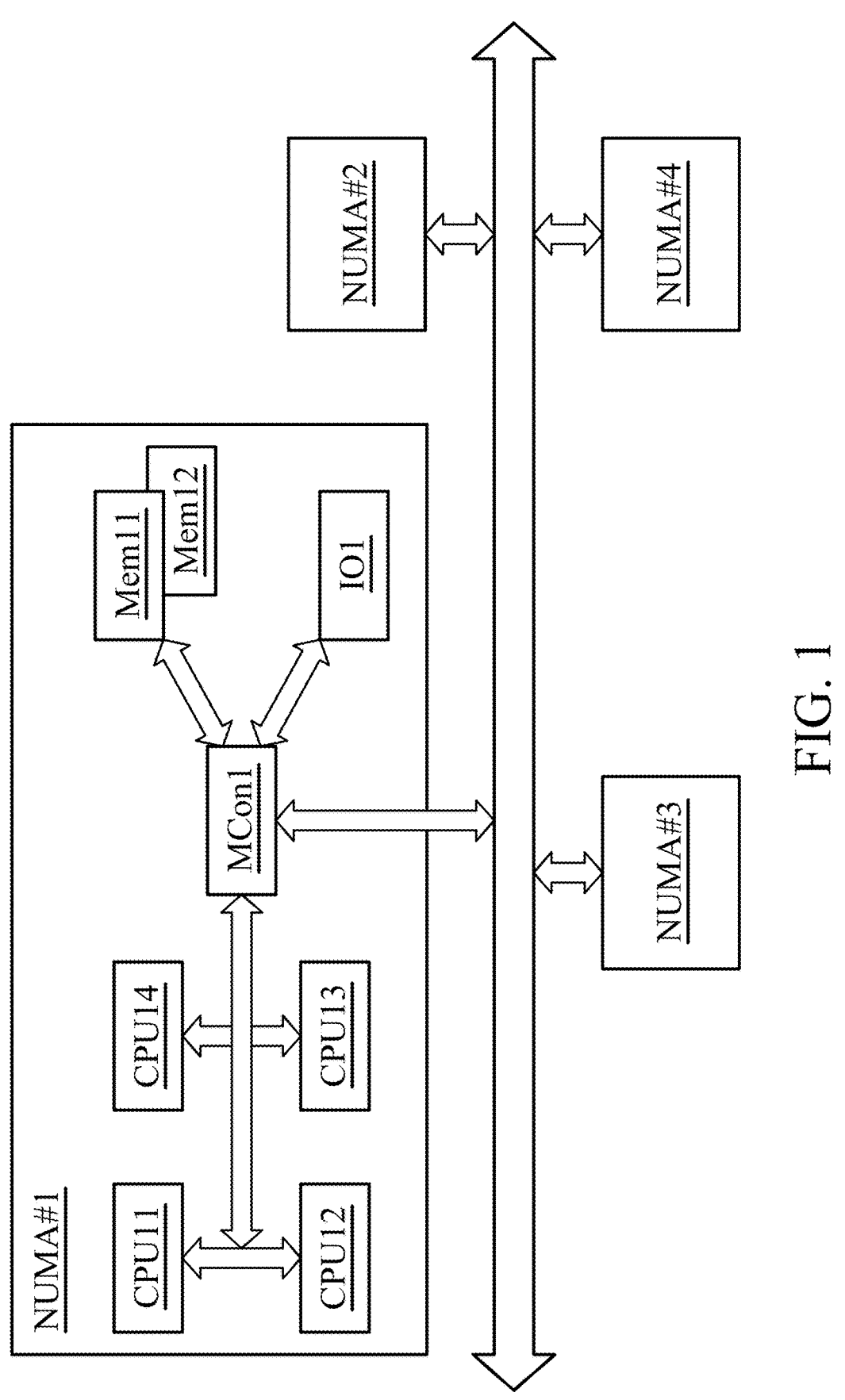
FIG. 1 illustrates a processor 100 in accordance with an exemplary embodiment of the disclosure, in which the central processing unit (CPU) cores are configured to form several non-uniform memory access (NUMA) nodes NUMA #1, NUMA #2, NUMA #3, and NUMA #4.

FIG. 1 illustrates a processor 100 in accordance with an exemplary embodiment of the disclosure, in which the central processing unit (CPU) cores are configured to form several non-uniform memory access (NUMA) nodes NUMA #1, NUMA #2, NUMA #3, and NUMA #4. Taking the NUMA node NUMA #1 as an example, it includes a plurality of CPU cores CPU11, CPU12, CPU13, and CPU14, which control a plurality of memories Mem11~Mem12 and an input and output device IO1 through a memory controller MCon1. Other NUMA nodes NUMA #2~NUMA #4 may have similar architecture.

The processor is not limited to the structure shown in FIG. 1. For example, in another exemplary embodiment, eight CPU cores may be grouped to form one NUMA node, and eight NUMA nodes form a 64-core processor.

The CPU cores at the same NUMA node may perform data synchronization in the second-level cache (L2 cache). When the accessing is cross the different NUMA nodes, system memory (such as DRAM) accessing is required, which may result in considerable performance losses.

To operate the shared computing resources in the execution of multiple processes, primitive locks (such as a spinlock locks or an osq locks) are generally used to allocate the shared computing resources. In a primitive lock mode, the process that applies the locking first gains right-of-access to the shared computing resources first, regardless of its NUMA node. Each primitive lock has only 4 bytes and takes up just a small space. The locking and unlocking procedure is simple and can run efficiently. However, the primitive lock does not work efficiently in a NUMA architecture. In an exemplary embodiment, there are three processes: the first, second, and third processes that occur in chronological order. The first process is running in the first NUMA node NUMA #1. The second process is running in the second NUMA node NUMA #2. The third process is running in the first NUMA node NUMA #1. According to the first-in and first-out rule, the locking and unlocking are first performed on the first NUMA node NUMA #1, then switched to the second NUMA node NUMA #2, and finally switched back to the first NUMA node NUMA #1. A large amount of data is transferred back and forth between the first NUMA node NUMA #1 and the second NUMA node NUMA #2, with a very poor efficiency.

In addition to using the primitive lock, the disclosure provides NUMA lock (suitable for the NUMA architecture) as an alternative. In the NUMA lock mode, the unlocking procedure gives priority to the processes waiting on the same NUMA node to unlock and run according to the first-in and first-out rule. When all the processes waiting on this NUMA node are executed or the execution exceeds the predetermined number of times, the unlocking right is changed to the earliest waiting process on another NUMA node. Then, the unlocking procedure is performed on the waiting processes on the NUMA node. Referring to the aforementioned first process (NUMA #1), second process (NUMA #2), and third process (NUMA #1), the first process (NUMA #1) and the third process (NUMA #1) are locked to gain right-of-access to the shared computing resource in turn, then change to the second process (NUMA #2). The number of cross-NUMA-node events is significantly reduced, and the system speed is improved.

The NUMA lock mode is particularly suitable for a competitive computing environment (e.g., with concurrent processes requesting to access to the same computing resources). In particular, the NUMA lock algorithm is adaptive to the different processor architectures in the detailed controls. However, the NUMA lock algorithm is far more complex than the primitive lock algorithm. In a less competitive environment with only a few concurrent processes, the performance of NUMA lock is not as good as the primitive lock. In the disclosure, it is dynamically switched between the primitive lock mode and the NUMA lock mode based on the competition intensity.

Such an adaptable locking design has its benefits. Each NUMA lock must occupy cache lines equal to the number of NUMA nodes. From startup to stable operating on the desktop, the Linux operating system initializes more than 30,000 locks. The excessive use of NUMA locks may occupy a considerable memory space.

Even though there are so many locks in the Linux kernel runtime, most of them are not coveted locks. According to the technology in this disclosure, NUMA locks do not need to be fully introduced, so that the dynamic lock mode will not obviously affect the performance of the low competitive situations.

In this disclosure, the lock mode is switched between the primitive lock mode and the NUMA lock mode, and an efficient competition level detection mechanism and a reliable lock mode switching design are proposed. Accordingly, if there are fewer processes participating in the resource competition and the competition eases, the allocation of shared computing resource is reliably implemented by primitive locks. If more processes participating in the resource competition and the competition becomes fierce, the allocation of shared computing resource is reliably implemented by NUMA locks.

In this disclosure, through a lock-application instruction, the different processes executed by the different CPU cores queue up to gain the capability to operate the shared computing resource. According the execution of the lock-application instruction, a competition-level indicator is monitored.

As the competition-level indicator satisfies a first switching condition, the locking design for gaining right-of-access to the shared computing resource is switched from the primitive lock mode to the NUMA lock mode. When the first switching condition is satisfied, the subsequent processes are refused entry to the queue by the design of the lock-application instruction. The subsequent processes need to wait until all queued processes had gained the right of access through the primitive lock. After all queued processes are processed through the primitive lock, the subsequent processes are allowed to be pushed into the NUMA lock queue.

In the NUMA lock mode, if the competition-level indicator satisfies a second switching condition, the locking design for the use of the shared computing resource is switched back to the primitive lock mode. In order to reliably switch back to the primitive lock mode, this disclosure also provides the related mechanisms.

In an exemplary embodiment, the competition-level indicator includes information related to depth data, which represents the number of processes that have submitted lock applications but have not proceeded to the unlocking procedure yet. In an exemplary embodiment, the depth data is incremented by 1 when a process applies for the lock, and is decremented by 1 when a process proceeds to the unlocking procedure. In response to the depth data exceeding a threshold a predetermined number of times, the locking design for the use of the shared computing resource is switched from the primitive lock mode to the NUMA lock mode. The predetermined number for depth data checking may be 1 or more times.

In another exemplary embodiment, the competition-level indicator includes information about the number of cross-NUMA-node events. In response to the cross-NUMA-node number exceeding a threshold a predetermined number of times, the locking design for the use of the shared computing resource is switched from the primitive lock mode to the NUMA lock mode. The predetermined number for depth data checking may be 1 or more times.

In addition to being implemented in software, the above-mentioned competition-level indicator monitoring and the reliable lock mode switching mechanisms may be alternately implemented through extended instructions (for example, extended x86 microprocessor instructions). The extended instructions can realize the dynamic lock mode switching more efficiently and avoid other performance losses introduced by software implementations.

The monitoring of depth data is detailed in the following. The same concept may be implemented in the monitoring of the cross-NUMA-node number.

First, the software implementation is discussed. In an exemplary embodiment, regardless of whether the access target of the lock-application instruction is locked with the other processes or not, the depth data related to the access target is increased by 1. Every time the access target is unlocked to the next process, the depth data is decreased by 1. The larger the depth data, the more intense the competition is. In an exemplary embodiment, in response to the depth data exceeding a threshold more than a predetermined number of times, the lock mode is switched from the primitive lock mode to the NUMA lock mode.

However, synchronization between the CPU cores is required in the lock competition. For example, in response to a first CPU core competing to access a target, the lock data structure "lock" and depth data "depth" in the cache of the other CPU cores are invalidated after being synchronized to the cache lines of the first CPU core. The first CPU core first operates according to the lock data structure "lock" and then updates the depth data "depth". If a second CPU core joins the competition for the same target, the lock data structure "lock" and depth data "depth" cached in the first CPU core are also invalidated. In an example, the management of the depth data "depth" and the management of the lock data structure "lock" are executed by two separate instructions. When the first CPU core finishes the management of the lock data structure "lock" but does not manage the depth data "depth" yet, there may be a second CPU core gains the right to get the cached contents and manage the lock data structure "lock". When it turns to the first CPU core to manage the depth data "depth", the cached lines need to be synchronized again, which increases the synchronization overhead.

In an exemplary embodiment, the lock-application instruction involves management of the depth data. Accordingly, one implementation is to modify the data structure of primitive lock, to make it further carries the depth data.

Taking the primitive lock, spinlock, as an example, a comparison-with-exchange instruction, cmpxchg, is generally used to submit the lock application. The conventional comparison-with-exchange instruction, cmpxchg, compares a register AL/AX/EAX/RAX with the destination operand. If the comparison result is equal, the source operand is updated to the destination operand (i.e., exchanged). If the comparison result is not equal, the source operand is not exchanged to the destination operand, and the destination operand is loaded to the register AL/AX/EAX/RAX.

A comparison-with-exchange instruction, cmpxchg, can be used to queue the processes to compete for the access to the target. When multiple CPU cores request to access the target, the execution of the comparison-with-exchange instruction, cmpxchg, can determine whether the access target has been locked. For example, when a process requests to access a shared computing resource, a comparison-with-exchange, cmpxchg, is executed to compare the lock data structure ("lock", which is the destination operand) of the access target with an unlocked state 0, to determine whether the access target has already been switched to the locked state 1 (copied from the source operand). If the access target is in the unlocked state 0, the process is allowed to operate the shared computing resource, and the lock data structure "lock" of the access target is updated to the locked state 1. If another process request to access the shared computing resource, the locked state 1 (different from the unlocked state 0) of the access target will be identified by the comparison-with-exchange instruction cmpxchg, and the process requesting to access the target will enter the queue. The queued process will gain the right of access later when the access target is unlocked.

In an exemplary embodiment, a novel lock-application instruction is proposed, which is not only used as a comparison-with-exchange instruction, but also involves the management of depth data. In this manner, the lock data structure "lock" and the depth data "depth" and cached in the same cache line and adjacent to each other. The lock data structure "lock" and the depth data "depth" can be managed by the same instruction, reducing the loss due to the synchronization between CPU cores.

In an exemplary embodiment, corresponding to the instruction extension, the lock data structure "lock" is modified. FIG. 2 shows a lock data structure "raw_spinlock" modified from a primitive lock "spinlock". The content of the primitive lock "spinlock" is "raw_lock". The depth data "depth" shows the number of processes that have submitted lock applications but have not been locked and proceeded to the unlocking process yet. Every time a process applies for a lock, the depth data is increased by 1. If any process is unlocked, the depth data is decreased by 1. A control flag "numa_eable" is provided to enable the NUMA/primitive lock mode, to suspend the locking mechanism, or some more functions. The number of times that the depth data "depth" exceeds a threshold is represented by "count", which is used to determine whether to switch to the NUMA lock mode. The index of the NUMA lock in the memory is represented by "numa_lock_index". When the NUMA lock mode is enabled, a pre-allocated memory table is checked according to the index "numa_lock_index", to find the required lock from the memory. In an exemplary embodiment, the NUMA lock data structure may be pre-organized (such as when booting) on the system memory. When the NUMA lock mode is enabled, a pointer can be recorded in an index table to point to the required NUMA lock data structure on the system memory.

Based on the lock data structure "raw_spinlock" extended from the primitive lock "spinlock", a comparison-with-exchange-and-accumulation instruction, cmpxchg64_inc, may be extended from the conventional comparison-with-exchange instruction, cmpxchg. The instruction operand is 64 bits (2N bits), but it is not limited. The calculations of the lower 32 bits (the lower N bits) are the same as the conventional comparison-with-exchange instruction, cmpxchg. The calculations of the higher 32 bits (the higher N bits) implement the accumulation of the depth data "depth". The comparison-with-exchange-and-accumulation instruction, cmpxchg64_inc, may be used as a new lock-application instruction, which guarantees the separated calculations on two 32-bit numbers. In another exemplary embodiment, the instruction operand is M+N bits (M and N are numbers), the calculations of the higher N bits implement the accumulation of the depth data "depth", and the calculations of the lower M bits are used as the conventional comparison-with-exchange instruction, cmpxchg.

In an exemplary embodiment, the lock-application instruction is:

CMPXCHG_INC r/m64, r32

The higher 32 bits of the register r/m64 implement the accumulation. The lower 32 bits of register r/m64 are compared with the register EAX. When the lower 32 bits of the r/m64 are equal to EAX, the register ZF stores 1, the register r/m64 is loaded into the register RAX, and a register r32 is loaded into the lower 32 bits of r/m64. When the lower 32 bits of r/m64 are not equal to EAX, ZF is cleared to 0, and r/m64 is loaded into the register RAX.

The competition to access a shared computing resource may be implemented by an exchange instruction, xchg. For example, the exchange instruction, xchg, may be executed to compete for a primitive lock osq_lock. A conventional exchange instruction, xchg, outputs the content of the first operand and exchanges the second operand to the first operand. The lower bits of the lock data structure "lock" of the access target is 0 when it is not locked. In response to a process that applies for access to a shared computing resource, an exchange instruction xchg is executed. The lower bits of the lock data structure "lock" of the access target is output, and the process tag "curr" (such as the CPU number) is updated into the lower bits of the lock data structure "lock". If the output of the exchange instruction xchg is 0, it means that the access target is not locked. This process is allowed to operate the shared computing resource. When the next process request to access the target, the lower bits of the lock data structure "lock" that have already been updated to a process tag (non-zero) will be identified, and the process currently submits the lock application is pushed into the queue. The queued process will not gain the right of access until the access target is unlocked.

FIG. 3 shows a lock data structure "optimistic_spin_queue" extended from a primitive lock "osq_lock". Similar to the aforementioned example about the primitive lock "spinlock", the extended lock includes not only the basic lock tail but also the fields: depth, numa_eable, count, and numa_lock_index.

Based on the lock data structure "optimistic_spin_queue" extended from the primitive lock osq_lock, the conventional exchange instruction, xchg, may be modified to an exchange-and-accumulation instruction, xchg64_inc. The instruction operand is 64 bits (2N bits), but it is not limited. The calculations of the lower 32 bits (the lower N bits) are the same as the conventional exchange instruction, xchg. The calculations of the higher 32 bits (the higher N bits) implement the accumulation of the depth data "depth". The exchange-and-accumulation instruction, xchg64_inc, may be used as a new lock-application instruction, which guarantees the separated calculations on two 32-bit numbers. In another exemplary embodiment, the instruction operand is M+N bits (M and N are numbers), the calculations of the higher N bits implement the accumulation of the depth data "depth", and the calculations of the lower M bits are used as the conventional exchange instruction, xchg.

In an exemplary embodiment, the lock-application instruction is:

CMPNEXCHGINC r/m64, r32

The lower 32 bits of register r/m64 are compared with register EAX. When the lower 32 bits of r/m64 are equal to EAX, the register ZF is set to 1, and the register r/m64 is loaded into the register RAX. When the lower 32 bits of r/m64 are not equal to EAX, the register ZF is cleared to 0, the higher 32 bits of register r/m64 implement the accumulation, the register r/m64 is loaded into the register RAX, and the register r32 is loaded into the lower 32 bits of the register r/m64.

Corresponding to the primitive lock osq_lock implemented by the exchange-and-accumulation instruction xchg64_inc, the unlocking instruction may be extended to include an action of minus 1 from the depth data "depth". In an exemplary embodiment, the unlocking of the primitive lock osq_lock is also based on the concept of the comparison-with-exchange instruction cmpxchg. In an exemplary embodiment, a comparison-with-exchange-and-decrement instruction, cmpxchg64_dec, is used as a new unlocking instruction. The instruction operand is 64 bits (2N bits), but not limited to it. The calculations of the lower 32 bits (the lower N bits) are the same as the conventional comparison-with-exchange instruction, cmpxchg. The calculations of the higher 32 bits (the higher N bits) implement the decrement of the depth data "depth". In some other exemplary embodiments, the instruction operand is M+N bits (M and N are numbers), the calculations of the higher N bits implement the decrement of the depth data "depth", and the calculations of the lower M bits act as the conventional comparison-with-exchange instruction, cmpxchg.

In an exemplary embodiment, the unlocking instruction is:

CMPXCHG_DEC r/m64, r32

The higher 32 bits of the register r/m64 implement the decrementing of the depth data. The lower 32 bits of the register r/m64 are compared with the register EAX. When the lower 32 bits of r/m64 are equal to EAX, the register ZF is set to 1, the register r/m64 is loaded into the register RAX, and the register r32 is loaded into the lower 32 bits of the register r/m64. When the lower 32 bits of r/m64 are not equal to EAX, the register ZF is cleared to 0, and the register r/m64 is loaded into the register RAX.

In this disclosure, the competition intensity is monitored through the proposed data structure, and the lock mode is automatically switched accordingly. Since the changes are limited to the lock management process itself, and there is no need to allocate the memory for every lock for initialization of complex NUMA locks, the scale of change is acceptable to the Linux kernel organization.

The following discusses how to safely switch from the primitive lock mode to the NUMA lock mode so that the queued processes waiting to use the primitive lock can reliably work.

Different from a conventional exchange instruction xchg, an equal-without-exchange instruction is proposed here. In addition to the functions of an exchange instruction xchg, the equal-without-exchange instruction further involves a comparison between its destination operand and source operand. If the destination operand and the source operand are the same, no exchange is performed.

As mentioned above, an exchange instruction xchg is executed to push the processes competing for primitive lock osq_lock into a queue. Unlike the comparison-with-exchange instruction cmpxchg that performs exchange when the comparison result is equal, the exchange instruction xchg always directly exchanges data. However, this design is not suitable to the lock mode switching design. When the condition for the lock mode switching is satisfied, the subsequent processes should not be pushed into the queue to compete for the primitive lock osq_lock. The equal-without-exchange instruction, xchg_new, proposed in this disclosure is used to replace the conventional exchange instruction, xchg, to achieve this purpose.

In the primitive lock mode, the equal-without-exchange instruction xchg_new manages the competition queue for the primitive lock. In addition to implementing the function of the exchange instruction xchg, the equal-without-exchange instruction xchg_new further compares a lock variable (the tail bits of the lock data structure "lock") with a default value (all 'F'). When the tail bits of the lock data structure "lock" are not all 'F', the behavior of the equal-without-exchange instruction xchg_new is the same as the exchange instruction xchg, and the process of applying for the lock is pushed into the queue. When switching from the primitive lock mode to the NUMA lock mode, the tail bits of the lock data structure "lock" are all set to 'F', which are identified by the equal-without-exchange instruction xchg_new so that no exchange is performed. This process therefore is not pushed into the queue and waits in a loop. After the remaining processes in the queue finish their use of the primitive lock osq_lock, the postponed process is allowed to be pushed into the queue to compete for a NUMA lock. In this way, the kernel lock mode is switched reliably.

The following describes how to return from the NUMA lock mode to the primitive lock mode.

When switching from the primitive lock mode to the NUMA lock mode, a column of a pre-allocated memory table in the memory is in use. When switching from the NUMA lock mode back to the primitive lock mode, the column of storage needs to be released. However, there may be some processes that also want to apply for the lock during the switching of the lock mode (from the NUMA lock mode back to the primitive lock mode). Since the related storage column has already been released, the system is deadlocked. This disclosure introduces a checking mechanism to address this problem. Part of the process of applying for the lock includes checking whether the target address still belongs to the target lock. If not, the process waits in a loop till the lock mode is indeed switched to the primitive lock mode. Then, the process is retired from the loop to apply for the lock again.

In view of the aforementioned checking mechanism, FIG. 4 illustrates the corresponding NUMA lock data structure "numa_lock", which contains information about its corresponding primitive lock. Referring to the illustrated NUMA lock data structure "numa_lock", the higher 32 bits (lock_id) show the memory address of the primitive lock, and the lower 32 bits (tail) show a tail number representing the access amount. On the same NUMA node, the number of processes applying for the lock may be used as the competition-level indicator. When the number does not exceeding a threshold (e.g., 0), it means that the competition for lock is not fierce, and the NUMA lock mode is switched back to the primitive lock mode. Alternatively, the aforementioned depth data can also be used as an indicator to switch the lock mode from the NUMA lock mode to the primitive lock mode. When the variable lock_id carried in the NUMA lock data structure "numa_lock" is cleared, it means that the connection between the NUMA lock and its corresponding primitive lock is broken. Under such a design, when competing for the a NUMA lock, it is necessary to check whether the variable lock_id carried in the NUMA lock data structure "numa_lock" matches the address of the primitive lock that should be mapped to the NUMA lock. If so, the NUMA lock is reliable. Otherwise, it means that the lock mode has been switched from the NUMA lock mode to the primitive lock mode, and no reliable NUMA lock is available. The process needs to wait until the lock mode switching is actually completed. Then, the process should request to compete for the primitive lock again.

In some embodiments, the NUMA lock data structure may use 48/32 bits to record the memory address lock_id of its corresponding primitive lock, and only 16/32 bits are reserved as the tail bits.

In an exemplary embodiment, a NUMA lock data structure includes lock information other than the memory address lock_id. The memory address of the mapped primitive lock recorded in the high 32/48 bits of lock_id may be replaced by the lock information. When the lock information matches unique tag information about a primitive lock mapped to the NUMA lock, the NUMA lock, it means that the NUMA lock is reliable; otherwise, it is unreliable.

In an exemplary embodiment, a high-bit comparison-with-exchange instruction, CMPNEXCHG, is proposed as a lock-application instruction, by which the processes are queued to compete for the access target, and the matching between NUMA lock and primitive lock is identified by the high-bit calculations introduced by the high-bit comparison-with-exchange instruction, CMPNEXCHG.

In an exemplary embodiment, a lock-application instruction is:

CMPNEXCHG r/m64, r16

The high 48/32 bits of the register r/m64 is compared with the high 48/32 bits of the register RAX. When the register r/m64 and the register EAX are not equal in their high 48 bits, or when the low 16 bits of r/m64 are 0xffff, the register ZF is cleared to 0, and the register r/m64 is loaded into the register RAX. Otherwise, the register ZF is set to 1, the register r/m64 is loaded into the register EAX, and the low 16 bits of register r16 are exchanged with the low 16 bits of register r/m64. In addition, a memory releasing code to be executed when leaving the NUMA lock mode is proposed.

The following describes a flowchart of applying for a lock and then unlocking the lock. The design concept is that when multiple processes compete for the same lock, if the number of competing processes (represented by depth data, or the number of cross-NUMA-node events) continues to exceed a default number, it will switch to using NUMA locks.

The switching from the primitive lock mode to the NUMA lock mode occurs when there is a large number of processes competing for the shared computing resource. The switching procedure must ensure that all processes (including the processes that are about to submit the lock application, the processes that have already submitted the lock application, the processes that have already queued, and the processes that have started the unlocking) can be processed correctly. For example, it is necessary to finish all the processes that have queued before really stopping the primitive lock and switched to the NUMA lock mode.

Figure 5:
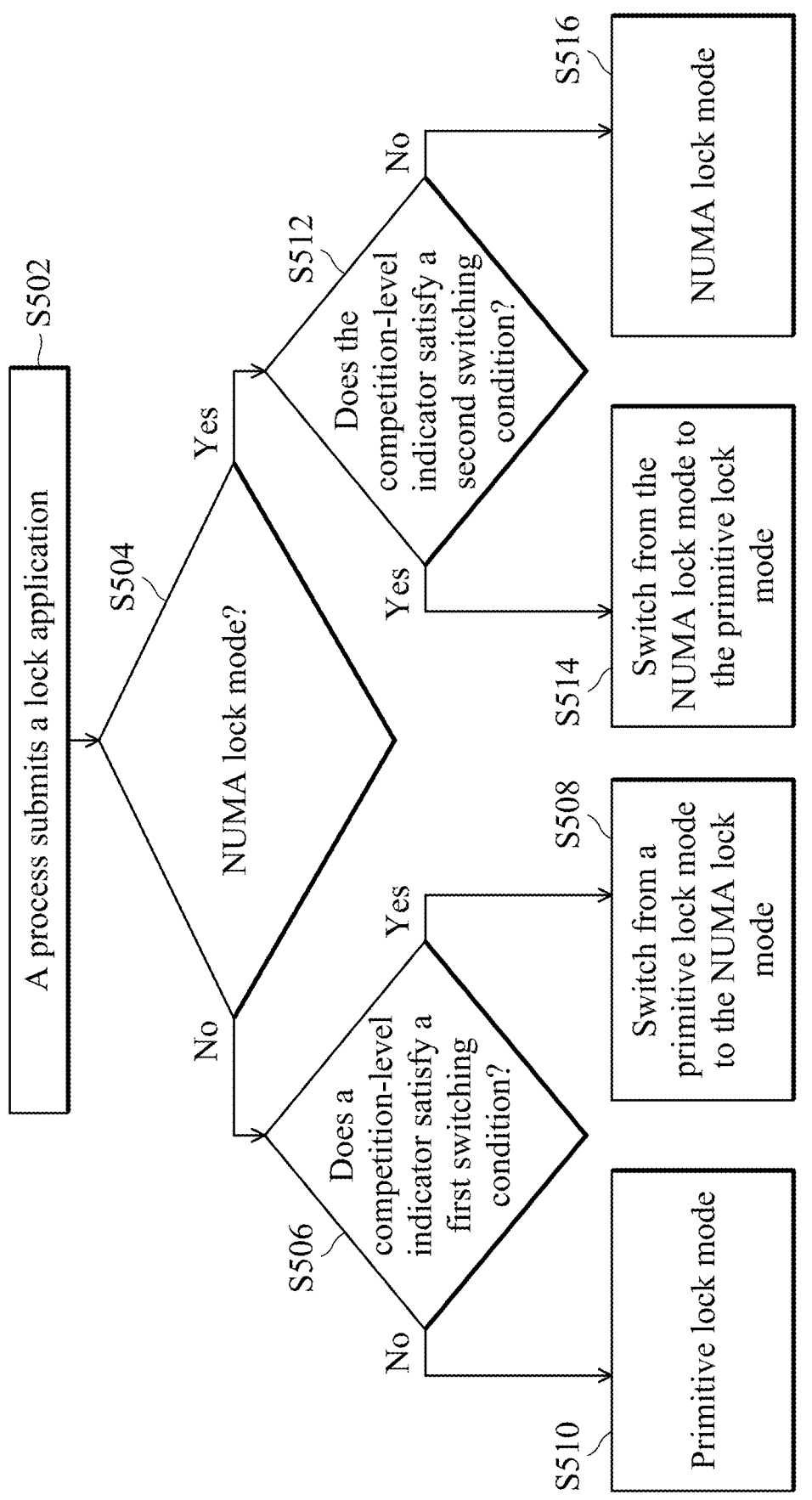
FIG. 5 is a flow chart illustrating a method for operating a multi-core processor, by which a request for being locked with shared computing resources to gain the access right of the shared computing resources is handled in accordance with an exemplary embodiment of the disclosure.

FIG. 5 is a flow chart illustrating a method for operating a multi-core processor, by which a request for being locked with a shared computing resource to gain the right to access a shared computing resource is handled in accordance with an exemplary embodiment of the disclosure.

In step S502, a process submits a lock application, to access a share computing resource. In step S504, it is determined whether the lock mode is a NUMA lock mode. If not, step S506 checks whether a competition-level indicator satisfies a first switching condition. If satisfied, step S508 reliably switches the lock mode from a primitive lock mode to the NUMA lock mode. If not satisfied, step S510 keeps the primitive lock mode. To improve the reliability of the switching of step S508, the following steps are proposed. Once the first switching condition is satisfied, according to the lock-application instruction, it is refused to push the subsequent processes into the queue, until all the queued processes had been locked with the shared computing resource for operations and then been unlocked from the shared computing resource. After that, the processes are allowed to queue for the NUMA lock.

If step S504 determines that the lock mode is the NUMA lock mode, step S512 checks whether the competition-level indicator satisfies a second switching condition. If satisfied, step S514 reliably switches the lock mode from the NUMA lock mode to the primitive lock mode. If not satisfied, step S516 keeps the lock mode in the NUMA lock mode. To improve the reliability of the switching of step S514, the following tips are proposed. The data structure of a NUMA lock may include address information. When the address information matches the primitive lock address mapped to the NUMA lock, the NUMA lock is reliable; otherwise, it is unreliable.

The following discussion specifically takes the primitive lock osq_lock as an example.

Figure 6:
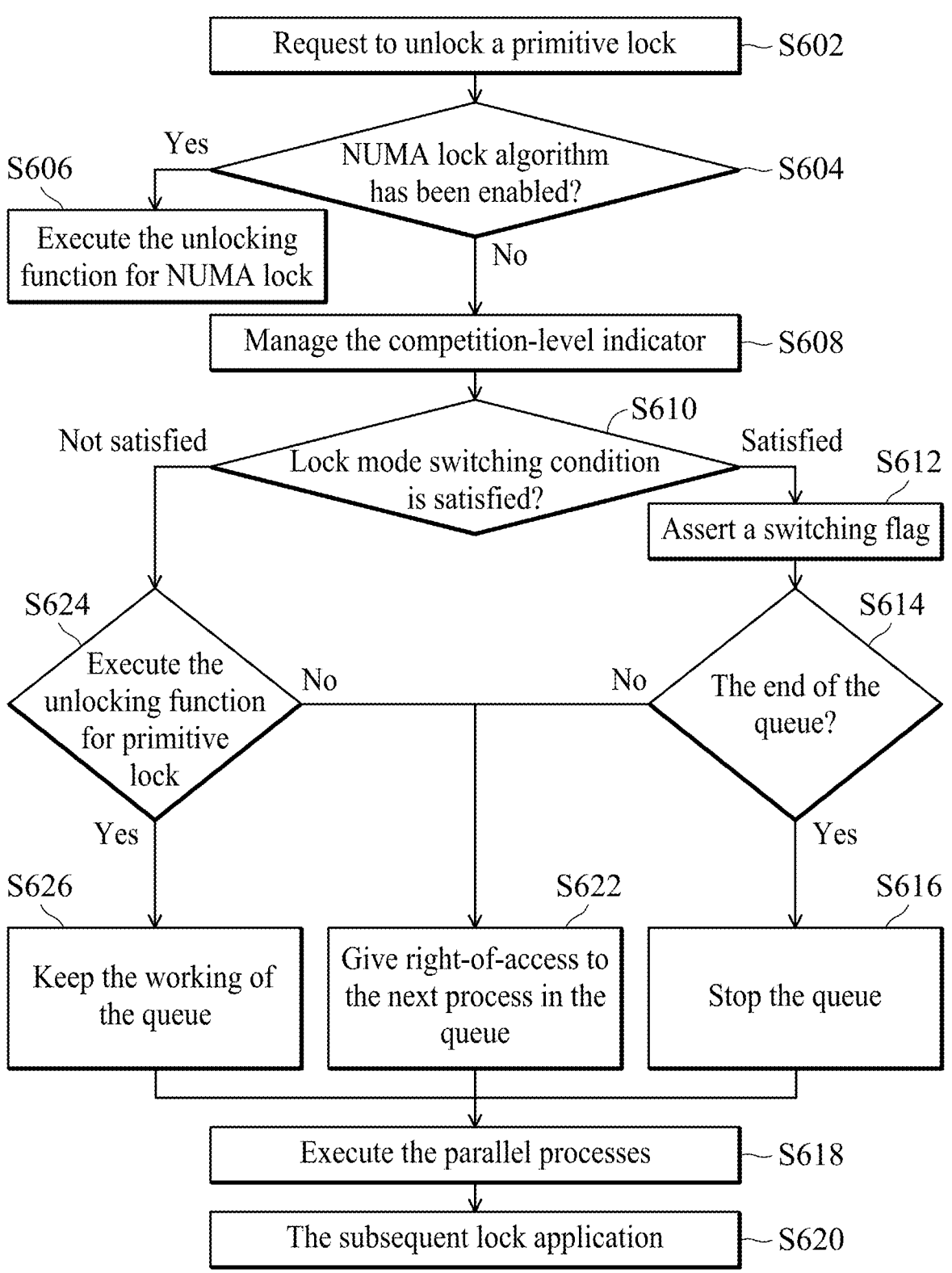
FIG. 6 is a flow chart illustrating the unlocking of a primitive lock osq_lock in accordance with an exemplary embodiment of the disclosure.

FIG. 6 is a flow chart illustrating the unlocking of a primitive lock osq_lock in accordance with an exemplary embodiment of the disclosure.

In response to step S602 that requests to unlock a primitive lock osq_lock, step S604 is performed to check whether the NUMA lock algorithm has been enabled. If the NUMA lock algorithm has been enabled, step S606 performs an unlocking function for the NUMA lock. If not, step S608 normally manages the competition-level indicator (including decrementing the value of depth data, or counting the number of cross-NUMA-node accesses) during the unlocking procedure. Step S610 checks whether the switching condition for switching the lock mode from the primitive lock mode to the NUMA lock mode is satisfied. If satisfied, step S612 asserts a switching flag and starts the switching procedure. In step S614, an unlocking function for the primitive lock osq_lock is performed, and it checks whether the unlocking has reached to the end of the queue. If yes, based on the asserted switching flag, step S616 stops the queue. In step S618, the parallel processes are executed. Step S620 proceeds to the subsequent lock application.

If step S614 determines that it is not the end of the queue, step S622 gives right-of-access to the next process in the queue, and then enters step S618 to execute the parallel processes.

If step S610 determines that the switching condition for switching the lock mode from the primitive lock mode to the NUMA lock mode is not satisfied, step S624 executes the unlocking function for the primitive lock osq_lock, and checks whether the unlocking has reached to the end of the queue. If yes, step S626 keeps the working of the queue, and the parallel processes are executed in step S618. If it is determined in step S624 that it is not the end of the queue, step S622 gives right-of-access to the next process in the queue, and then enters step S618 to execute the parallel processes.

Figure 7A:
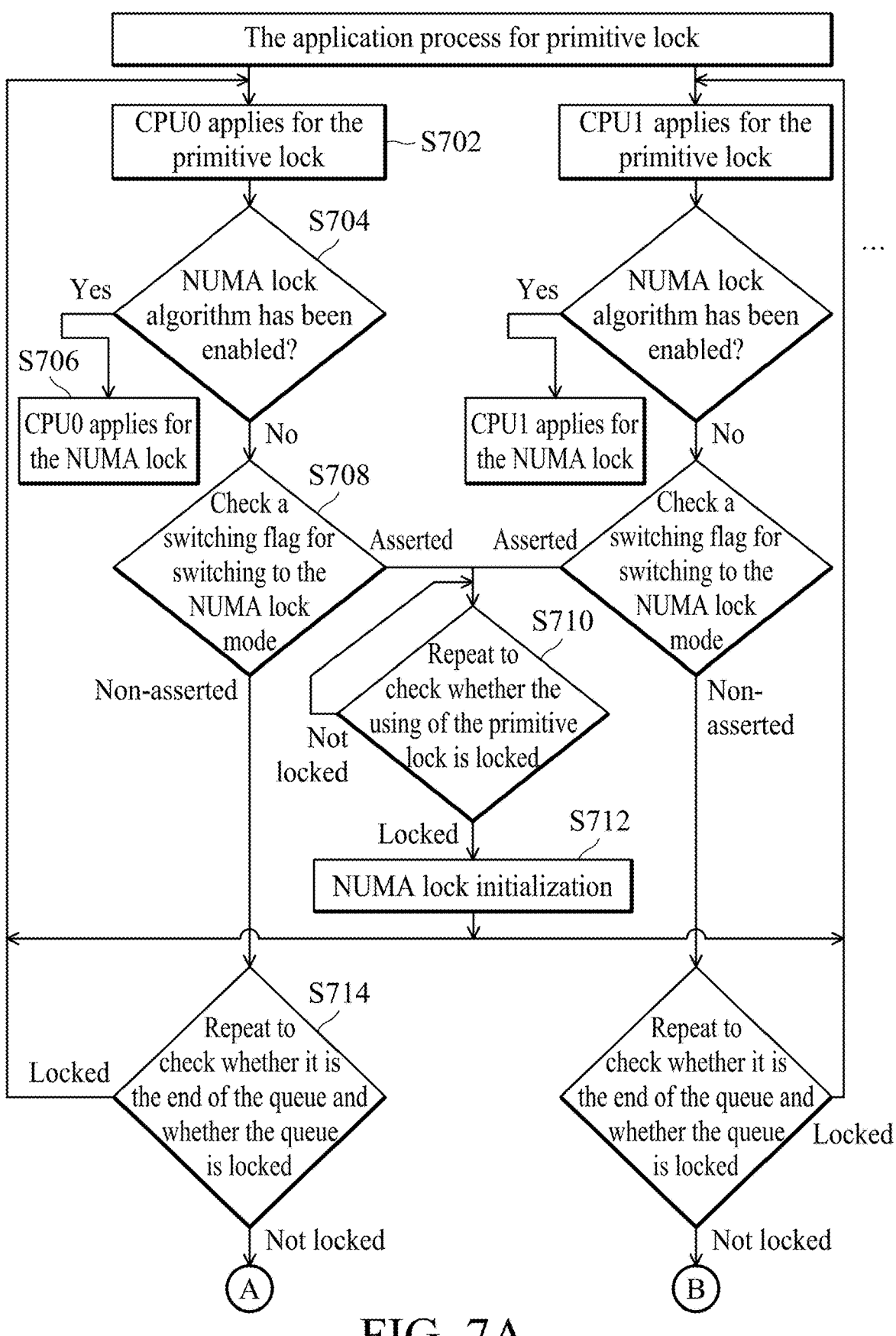
FIG. 7A and FIG. 7B show the flowchart illustrating the application process for the primitive lock osq_lock in accordance with an exemplary embodiment of the disclosure.
Figure 7B:
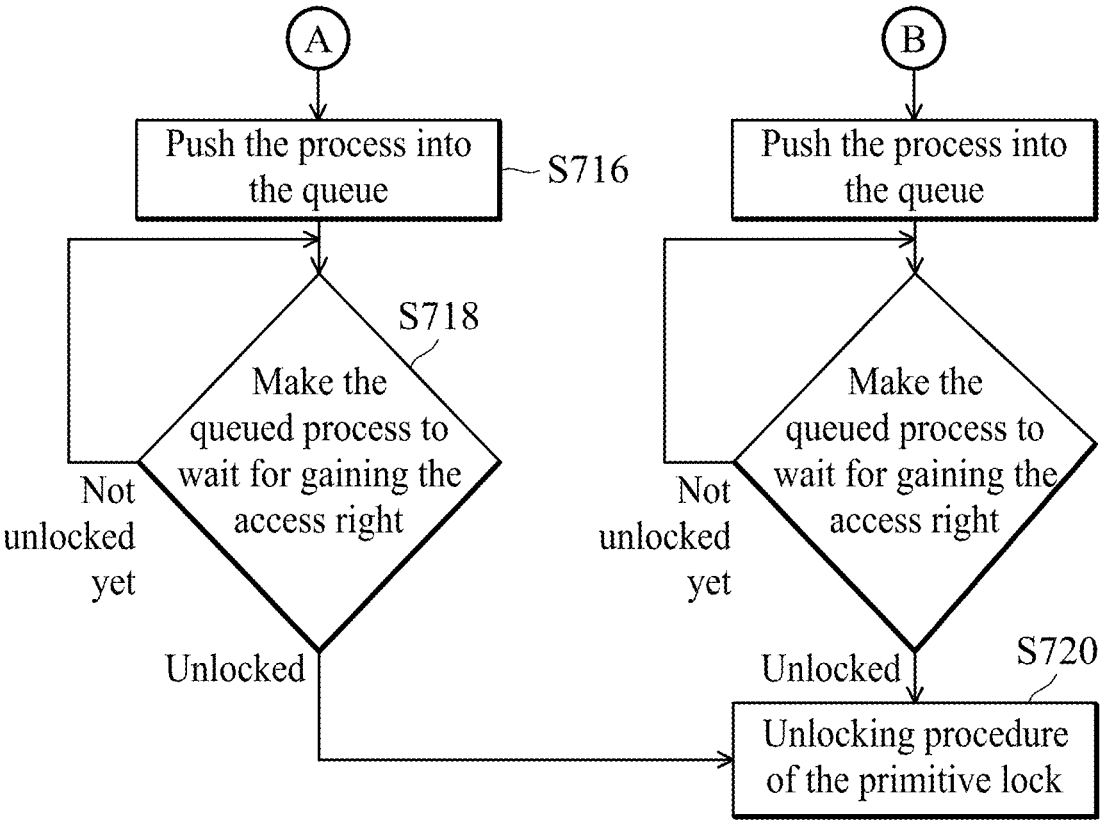

FIG. 7A and FIG. 7B show the flowchart illustrating the application process for the primitive lock osq_lock in accordance with an exemplary embodiment of the disclosure. On the different CPU cores CPU0 to CPUn, the different processes are running and may apply to be locked to the shared computing resource to gain right-of-access to the shared computing resource. The actions of the central processing unit CPU0 are specifically described below.

After being locked for operations and then being unlocked, a process can come to the primitive lock (osq_lock) application entrance to apply for the next round of being locked and then unlocked. In step S702, the central processing unit CPU0 applies for the primitive lock osq_lock. Step S704 determines whether the NUMA lock algorithm has been enabled. If so, step S706 instructs the central processing unit CPU0 to apply for the NUMA lock. If not, step S708 checks a switching flag for switching to the NUMA lock mode. The asserted state of the switching flag means that the multi-core coordination control is enabled, and step S710 repeats to check whether the using of the primitive lock osq_lock is locked. If the using of the primitive lock osq_lock is not locked, CPU0 enters a loop and keeps waiting. If the using of the primitive lock osq_lock is locked, the multi-core coordination control ends, and it is time to switch to the NUMA lock mode. In step S712, because the using of the primitive lock osq_lock is locked, the primitive lock programs (osq_lock) on all Linux kernels are marked as stopped. After competition, the process winning the competition initializes the NUMA lock data structure to enable the NUMA lock, and then applies for the primitive lock osq_lock again.

If step S708 does not obtain the asserted state of the switching flag, step S714 repeats to check whether it is the end of the queue and whether the queue is locked. If the queue is not locked, step S716 pushes the process into the queue normally. Step 718 makes the queued process to wait for gaining the access right, and then step S720 enters the unlocking procedure of the primitive lock (referring to FIG. 6). If step S714 determines that the queue is locked and the unlocking procedure has proceeded to the end of the queue, the lock application procedure is called again.

In particular, in response to the switching flag asserted in step S612 of FIG. 6, the processes newly submitting the lock application for the primitive lock are postponed by steps S710 and S712. As for the running processes, they are pushed into the queue if step S714 identifies that the queue is not locked. Thus, the unlocking procedure has not proceeded to the end of the queue, and there is the next process to be locked and then unlocked. As for the processes which have proceeded to the steps subsequent to step S714, they are waiting in the queue to be locked and then unlocked. Step S714 is an atomic operation, and works consistently even if the multiple CPU cores are running simultaneously. When all processes detect the locked queue, complete the initialization of NUMA locking, and submit the lock application for primitive lock again, the procedures performs the branches S606 or S706. That is, the lock mode switching from the primitive lock mode to the NUMA lock mode is completed in the Linux kernel.

The correct switching from the primitive lock mode to the NUMA lock mode is based on step S714, which reliably locks the queue.

This disclosure combines the advantages of primitive locks and NUMA locks, and can automatically switch between the NUMA lock mode and the primitive lock mode according to the competition between the CPU cores. The primitive lock is used when the competition level is low. When the competition level raises, the lock mode is automatically switched from the primitive lock mode to the NUMA lock mode. According to the adaptive switching of lock mode, a benchmark program or a multi-core application runs efficiently because there are only a dozen (or less) highly competitive events. The memory consumption due to NUMA locks can be ignored.

The lock-application instruction in this disclosure may be implemented in the following manners.

In an exemplary embodiment, the lock-application instruction is a high-bit comparison-with-exchange instruction. An exchange action is performed when the high bits show a primitive lock mark and the low bits do not show the expected locking value.

In an exemplary embodiment, the exchange action is stopped when the high bits do not show the primitive lock mark or the low bits indeed show the expected locking value.

In an exemplary embodiment, when the second switching condition for switching from the NUMA lock mode to the primitive lock mode is satisfied and all queued processes gain right-of-access to the shared computing resource through the NUMA lock, the low bits of the instruction operand are set to the expected locking value, and the primitive lock mark is deleted from the high bits of the instruction operand. Thus, the subsequent exchange requests for lock application are rejected, and are not pushed into the queue until the primitive lock mode is really restored.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multi-core processor, comprising:
a plurality of central processing unit (CPU) cores configured to form a plurality of non-uniform memory access (NUMA) nodes,
wherein:
by executing a lock-application instruction, different processes running on different CPU cores applying for a lock of a shared computing resource are queued, to be locked with the shared computing resource to gain access rights to the shared computing resource;
the execution of the lock-application instruction involves monitoring a competition-level indicator;

in response to the competition-level indicator satisfying a first switching condition, the lock of the shared computing resource is switched from a primitive lock mode to a NUMA lock mode;

in the primitive lock mode, the processes follow a first-in and first-out rule to gain the lock of the shared computing resource, regardless of their NUMA nodes;

in the NUMA lock mode, the processes on a same NUMA node with the shared computing resource gain the lock of the shared computing resource first; and after the first switching condition is satisfied, through the execution of the lock-application instruction, subsequent processes applying for the lock are not permitted to enter the queue until all processes already queued gain a primitive lock for operations in turn, and then the subsequent processes are queued to gain a NUMA lock.

2. The multi-core processor as claimed in claim 1, wherein:
the competition-level indicator includes information about depth data, wherein the depth data shows the number of processes that have applied for the lock and have not been unlocked yet; and in response to depth data exceeding a threshold a predetermined number of times, the lock of the shared computing resource is switched from the primitive lock mode to the NUMA lock mode.

3. The multi-core processor as claimed in claim 2, wherein:
the depth data is increased every time a process applies for the lock of the shared computing resource, and is decreased every time a process is unlocked.

4. The multi-core processor as claimed in claim 3, wherein:
the depth data is presented in a primitive lock data structure; and the lock-application instruction invokes management of the depth data.

5. The multi-core processor as claimed in claim 4, wherein:
M and N are numbers; and an instruction operand of the lock-application instruction is M+N bits, the high N bits are for accumulation of the depth data, and the low M bits realize a comparison-with-exchange instruction.

6. The multi-core processor as claimed in claim 5, wherein the lock-application instruction is:
CMPXCHG_INC r/m64, r32, wherein the high 32 bits of a register, r/m64, are for accumulation;

the low 32 bits of r/m64 are compared with a register, EAX;

if the low 32 bits of r/m64 are equal to EAX, a register, ZF, is set to 1, r/m64 is loaded into a register, RAX, and a register, r32, is loaded into the low 32 bits of r/m64; and if the low 32 bits of r/m64 are not equal to EAX, ZF is cleared to 0, and r/m64 is loaded into RAX.

7. The multi-core processor as claimed in claim 4, wherein:
M and N are numbers; and an instruction operand of the lock-application instruction is M+N bits, the high N bits are for accumulation of the depth data, and the low M bits realize an exchange instruction.

8. The multi-core processor as claimed in claim 7, wherein the lock-application instruction is:

CMPNEXCHGINC r/m64, r32, wherein the low 32 bits of a register, r/m64, are compared with a register, EAX;

if the low 32 bits of r/m64 are equal to EAX, a register, ZF, is set to 1, and r/m64 is loaded into a register, RAX; and if the low 32 bits of r/m64 are not equal to EAX, ZF is cleared to 0, accumulation is performed on the high 32 bits of r/m64, r/m64 is loaded into RAX, and a register, r32, is loaded into the low 32 bits of r/m64.

9. The multi-core processor as claimed in claim 4, wherein:

by executing an unlocking instruction, a process gaining the lock releases the lock to the queued processes;

M and N are numbers; and an instruction operand of the unlocking instruction is M+N bits, the high N bits are for decreasing the depth data, and the low M bits realize a comparison-with-exchange instruction.

10. The multi-core processor as claimed in claim 9, wherein the unlocking instruction is:

CMPXCHG_DEC r/m64, r32, wherein the high 32 bits of a register, r/m64, are decremented;

the low 32 bits of r/m64 are compared with a register, EAX;

if the low 32 bits of r/m64 are equal to EAX, a register, ZF, is set to 1, r/m64 is loaded into a register, RAX, and a register, r32, is loaded into the lower 32 bits of r/m64; and if the low 32 bits of r/m64 are not equal to EAX, ZF is cleared to 0, and r/m64 is loaded into RAX.

11. The multi-core processor as claimed in claim 1, wherein:

the competition-level indicator further carries an over-threshold number that shows how many times data representing a competition level exceeds a threshold; and in response to the over-threshold number showing that the data representing the competition level exceeds a threshold a predetermined number of times, the lock of the shared computing resource is switched from the primitive lock mode to the NUMA lock mode.

12. The multi-core processor as claimed in claim 1, wherein:

the lock-application instruction is an equal-without-exchange instruction, which stops an exchange action when a lock variable is equal to a default value, otherwise, the equal-without-exchange instruction behaves as an exchange instruction; and after the first switching condition is satisfied, all queued processes gain the primitive lock for operations in turn and, the lock variable is set to the default value to prevent pushing more processes into the queue until NUMA lock resource is ready.

13. The multi-core processor as claimed in claim 1, wherein:

in response to the competition-level indicator satisfying a second switching condition, the lock of the shared computing resource is switched from the NUMA lock mode to the primitive lock mode.

14. The multi-core processor as claimed in claim 13, wherein:

the competition-level indicator shows a number of processes applying for locks on each NUMA node; and when a total number of processes applying for locks on each NUMA node is lower than a threshold, the second switching condition is satisfied.

15. The multi-core processor as claimed in claim 13, wherein:

a NUMA lock data structure includes lock information; and if the lock information matches unique tag information about a primitive lock mapped to a NUMA lock presented in the NUMA lock data structure, the NUMA lock is reliable; otherwise, the NUMA lock is unreliable.

16. The multi-core processor as claimed in claim 15, wherein:

the lock information is address information; and if the lock information matches address information of the primitive lock mapped to the NUMA lock, the NUMA lock is reliable; otherwise, the NUMA lock is unreliable.

17. The multi-core processor as claimed in claim 15, wherein:

a high-bit comparison-with-exchange instruction is executed to determine whether the lock information matches address information of the primitive lock mapped to the NUMA lock.

18. The multi-core processor as claimed in claim 15, wherein the lock-application instruction is:

CMPNEXCHG r/m64, r16, wherein a register, r/m64, is compared with a register, RAX in their high M bits, M is a number, and N is another number, where M+N is 64 or 32; and when the high M bits of r/m64 is different from the high M bits of a register, EAX, or low N bits of r/m64 are a preset locking value, 0xffff, a register ZF is cleared to 0, and r/m64 is loaded into RAX and; otherwise, ZF is set to 1, r/m64 is loaded into EAX, and a register, r16, is exchanged with the low N bits of r/m64.

19. The multi-core processor as claimed in claim 18, wherein:

after the second switching condition is satisfied, processes already queued gain the NUMA lock for operations in turn, low bits of a lock variable are set to an expected locking value, a primitive lock mark is deleted from high bits of the lock variable, and thereby subsequent processes are not allowed to be pushed into the queue again for a primitive lock till primitive lock resource is ready.

20. The multi-core processor as claimed in claim 15, wherein:

the lock-application instruction is a high-bit comparison-with-exchange instruction, which exchanges data when having high bits that are equal to a primitive lock mark and low bits that are different from an expected locking value.

21. The multi-core processor as claimed in claim 15, wherein:

the lock-application instruction is a high-bit comparison-with-exchange instruction, which stops exchanging data when having high bits that are different from a primitive lock mark and low bits that show an expected locking value.

22. A method for operating a multi-core processor, comprising:

allocating a plurality of central processing unit (CPU) cores to configure a plurality of non-uniform memory access (NUMA) nodes;

providing a lock-application instruction;

17 executing the lock-application instruction to queue different processes running on different CPU cores applying for a lock of the shared computing resource to be locked with the shared computing resource to gain access rights to the shared computing resource;

monitoring a competition-level indicator during the execution of the lock- application instruction;

determining that the competition-level indicator satisfies a first switching condition;

and switching the lock of the shared computing resource from a primitive lock mode to a NUMA lock mode;

wherein in the primitive lock mode, the processes follow the first-in and first-out rule to gain the lock of the shared computing resource, regardless of their NUMA nodes; wherein in the NUMA lock mode, the processes on a NUMA node with the shared computing resource gain the lock of the shared computing resource first; and after the first switching condition is satisfied, refusing entry to the queue for subsequent processes applying

18 for the lock through the execution of the lock-application instruction until processes already queued gain a primitive lock for operations in turn, and then queuing the subsequent processes to gain a NUMA lock.

23. The method as claimed in claim 22, further comprising:

determining whether the competition-level indicator satisfies a second switching condition; and switching the lock of the shared computing resource from the NUMA lock mode to the primitive lock mode when it is determined that the competition-level indicator satisfies the second switching condition.

24. The method as claimed in claim 23, wherein a NUMA lock data structure includes lock information;

determining the NUMA lock is reliable when the lock information matches unique tag information about a primitive lock mapped to a NUMA lock presented in the NUMA lock data structure; and otherwise determining the NUMA lock is unreliable.

* * * * *